(12) United States Patent
Hughes

(10) Patent No.: US 7,021,862 B2
(45) Date of Patent: Apr. 4, 2006

(54) METHOD FOR REMEDIATION OF CONTAMINATED GROUND AT OIL OR GAS FACILITY

(76) Inventor: Joe Hughes, P.O. Box 1200, Hobbs, NM (US) 88241

( * ) Notice: Subject to any disclaimer, the term of this patent is extended or adjusted under 35 U.S.C. 154(b) by 0 days.

(21) Appl. No.: 10/793,192

(22) Filed: Mar. 3, 2004

(65) Prior Publication Data

US 2004/0175237 A1    Sep. 9, 2004

Related U.S. Application Data

(60) Provisional application No. 60/452,127, filed on Mar. 4, 2003.

(51) Int. Cl.
*B09B 1/00* (2006.01)

(52) U.S. Cl. .............................. 405/128.1; 405/128.75

(58) Field of Classification Search ............. 405/128.1, 405/128.2, 128.25, 128.3, 128.45, 128.5, 405/128.75

See application file for complete search history.

(56) References Cited

U.S. PATENT DOCUMENTS

| | | | |
|---|---|---|---|
| 1,322,359 A | 11/1919 | Shelly | |
| 4,839,061 A * | 6/1989 | Manchak Jr. et al. | ... 405/128.25 |
| 4,911,330 A | 3/1990 | Vlaanderen et al. | |
| 5,035,537 A * | 7/1991 | Rose | ........................ 405/128.7 |
| 5,190,218 A * | 3/1993 | Kayser et al. | ............... 239/172 |
| 5,406,019 A * | 4/1995 | Dean | ..................... 405/128.25 |
| 5,511,907 A * | 4/1996 | Tabasco | .................. 405/128.15 |
| 5,560,737 A | 10/1996 | Schuring et al. | |
| 5,849,193 A | 12/1998 | Varadaraj et al. | |
| 5,879,107 A * | 3/1999 | Kiest et al. | ............... 405/128.5 |
| 6,039,882 A | 3/2000 | Wolfe et al. | |
| 6,121,040 A | 9/2000 | Sakuranaga et al. | |
| 6,262,002 B1 * | 7/2001 | Carey | ......................... 510/110 |
| 6,264,399 B1 | 7/2001 | Grisso et al. | |
| 6,276,871 B1 * | 8/2001 | Bruso | ...................... 405/128.5 |
| 6,326,187 B1 | 12/2001 | Jones et al. | |
| 6,344,355 B1 | 2/2002 | Hince et al. | |

* cited by examiner

*Primary Examiner*—John Kreck
(74) *Attorney, Agent, or Firm*—Vidal A. Oaxaca; Deborah A. Peacock; Peacock Myers, P.C.

(57) ABSTRACT

The present invention is a mobile, in situ applicator system and method for remediating contaminated soils at a site without the removal of those soils. The applicator system comprises a vehicle, preferably a chemical treatment vehicle used in the oil and gas industry, and fluid dispensing components comprising a tank, hose, and pump for the application to contaminated sites.

14 Claims, 2 Drawing Sheets

METHOD FOR REMEDIATION OF CONTAMINATED GROUND AT OIL OR GAS FACILITY

CROSS-REFERENCE TO A RELATED APPLICATION

This application is related to and claims priority to U.S. Provisional Patent Application Ser. No. 60/452,127, entitled "Applicator System for Remediation of Contaminated Soil", filed on Mar. 4, 2003, and the specification thereof is incorporated herein by reference.

BACKGROUND OF THE INVENTION

1. Field of the Invention (Technical Field)

The present invention relates to a mobile, in situ applicator system designed to remediate soils at a contaminated site without the removal of those soils and a method for the remediation of the soil. The applicator system comprises a combination of a vehicle, preferably a chemical treatment vehicle used in the oil and gas industry, and fluid dispensing components comprising a tank, hoses, and pump for the application to contaminated sites.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

The application of bioadditives to contaminated soils for remediation purposes is known. Also known is the use of vehicles to deliver and dispense chemical fluids to sites. There is a need, however, for an efficient and economic means to deliver and apply bioadditives to oil and gas well sites that have become contaminated.

BRIEF SUMMARY OF THE INVENTION

The present invention comprises a mobile, in situ applicator system for the remediation of contaminated sites comprising a combination of a vehicle and applicator components. The applicator components comprise at least one tank, remediation fluid disposed within the tank, at least one pump, at least one hose, and at least one nozzle system. The vehicle may comprise a chemical treater truck typically utilized in an oil and gas industry.

The tank is between approximately 50 and 200 gallons and may be between approximately 10 to 7,000 gallons. The pump may comprise a high-pressure pump and/or a mechanical pump and may be powered with power derived from the vehicle. The chemical treater truck may be an existing chemical treater truck. The invention may comprise two tanks, and the pump may be disposed under the tank or tanks.

The invention may comprise two tank hoses and two discharge hoses, one of each disposed on each side of the vehicle. The remediation fluid may comprise bioadditives.

The remediation fluid may be extracted from the tanks using suction. The combination may comprise a surfactant.

The invention further comprises a method for applying remediation fluids to contaminated sites comprising providing a vehicle and at least one tank, disposing the tank on the vehicle, connecting at least one tank hose to the tank, connecting at least one pump to the tank hose, attaching a discharge hose to the pump, attaching a nozzle system to the discharge hose, dispensing a remediation fluid within the tank, and applying the remediation fluid from the tank, through the hose and nozzle system to the contaminated site. The vehicle provided may comprise a chemical treater truck typically utilized in an oil and gas industry. The vehicle is delivered to contaminated sites in need of remediation.

The vehicle may be delivered to potentially contaminated oil and gas well sites pursuant to an oil and gas well maintenance schedule. Remediation fluid is applied to contaminated soil.

A primary object of the present invention is to remediate contaminated soil utilizing a remediation fluid application system that is mobile without the need to remove soil from the contaminated site.

A primary advantage of the present invention is that it is economical and efficient because existing chemical treating vehicles can be used as the means to make the apparatus mobile.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is a mobile, in situ applicator system designed to remediate soils at a site without the removal of those soils. The invention further comprises a method for remediating the soils.

Figure 1:
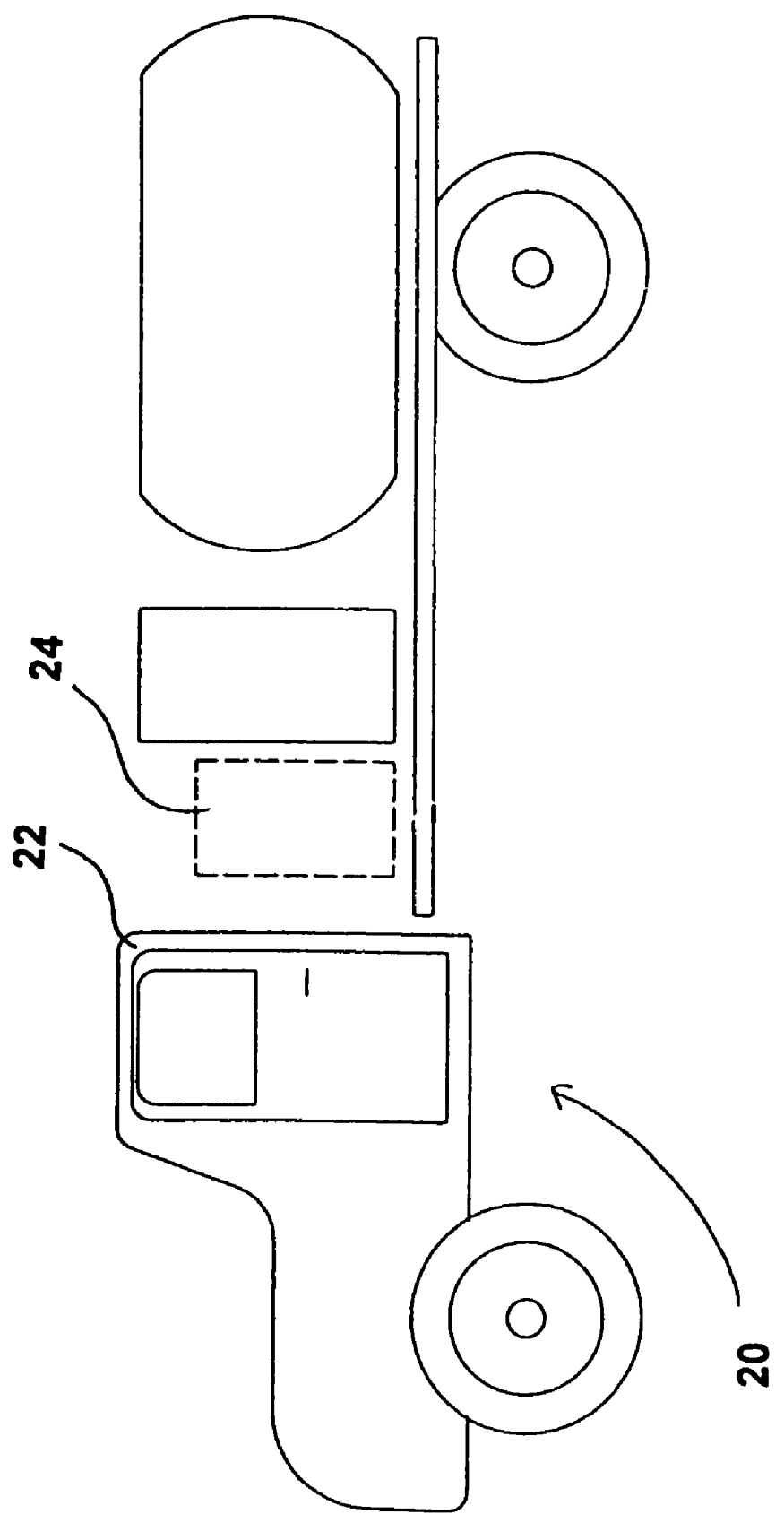
FIG. 1 is a side view of a preferred vehicle utilized in accordance with the present invention equipped with a tank.
Figure 2:
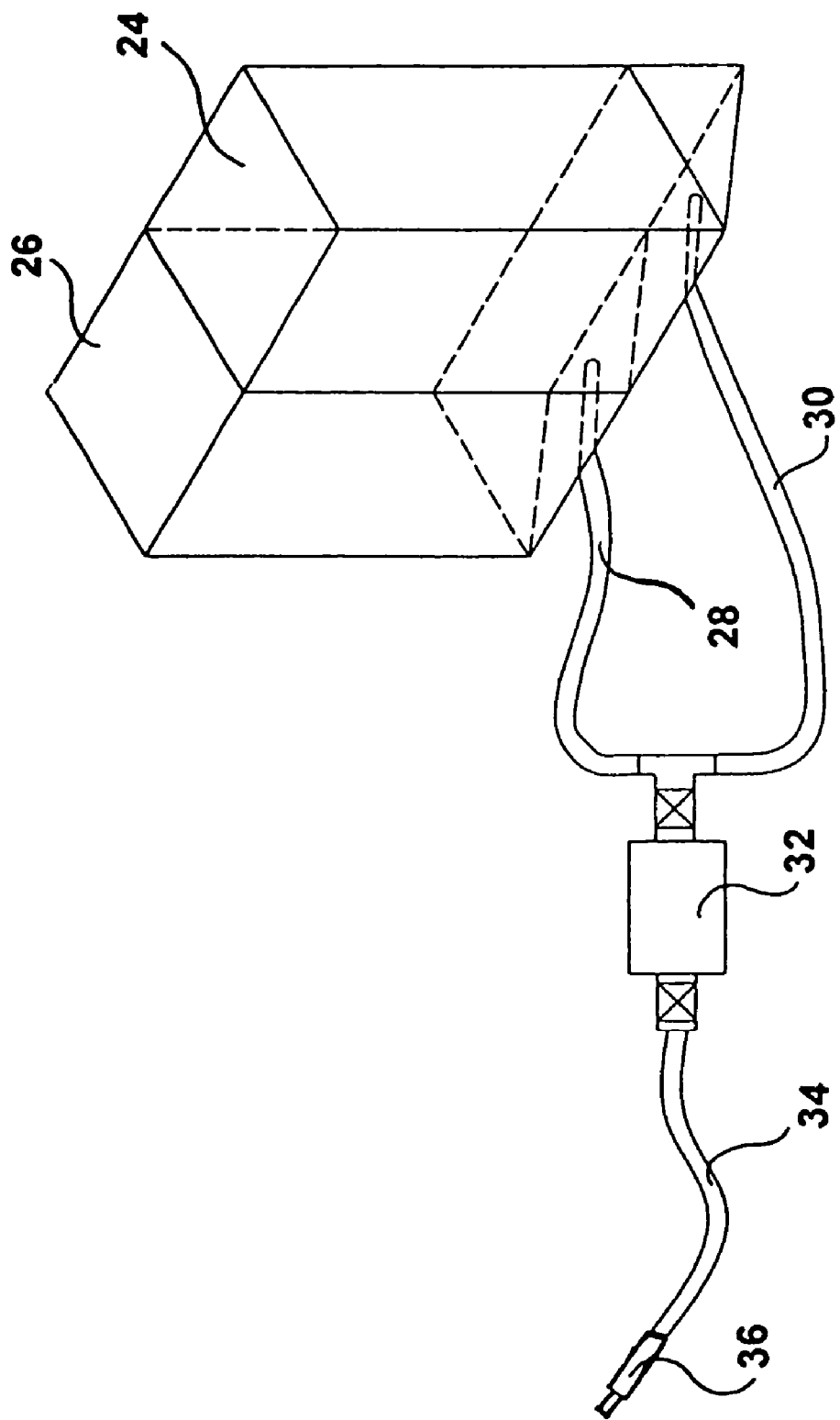
FIG. 2 is a perspective view of the preferred applicator components disposable on the vehicle.

Turning now to the figures, FIGS. 1 and 2 show the preferred embodiment wherein tank 24 is disposed on vehicle 20, preferably mounted on the frame of vehicle 20, just aft of vehicle cab 22. FIG. 2 shows the applicator components comprising tank 24 and tank 26 with tank hoses 28, 30 attached to pump 32. Discharge hose 34, with nozzle 36, is attached to pump 32. Vehicle 20 is preferably a "chemical treatment" truck used in an oil and gas industry, although any type vehicle may be utilized. Pump 32 is preferably mechanically driven and is preferably a high pressure pump. The components are for the application of remediation fluid containing bioadditives in an aqueous solution to contaminated sites.

The applicator system in the preferred embodiment is used on contamination found at oil and gas wells, facilities and installations. These sites include, but are not limited to wellheads, piping, flow lines, pumping units, compressors, treating vessels, tanks, sumps and general areas on and near the location of producing and abandoned oil wells, injection wells, disposal wells, and gas wells on public and private lands.

Tanks 24, 26 preferably comprise steel or a structural material that is coated to prevent corrosion from the chemical cargo. Mechanical pump 32 is preferably disposed under tanks 24, 26. The discharge unit may have more than one hose, preferably two tank hoses 28, 30, one disposed on each side of the vehicle, and two discharge hoses (only one discharge hose, 34, is shown), one disposed on each side of the vehicle.

The applicator system uses suction from tanks 24, 26, through pump 32 and out of discharge hose 34. Hoses, 28, 30, and 34 are preferably made of a flexible material that is not damaged by the bioadditives. Nozzle 36 is preferably made of corrosion-resistant metal or similar materials.

In the preferred embodiment, the applicator system is placed close cab 22 of vehicle 20—in chemical treater trucks tanks 24, 26 are disposed in front of the other tanks typically disposed on such trucks. The applicator system is thus preferably a dedicated applicator system. Mechanical pump 32 preferably runs on power generated from vehicle 20. Pump 32 is preferably a high-pressure pump as delivery of remediation fluids at high pressure helps deliver the remediation fluid and aerate the soil to improve the remediating microbial and enzymatic activities.

The bioadditives are preferably nitrogen, phosphorus, ammonium nitrate, sulfur, or any material designed to enhance remediation. These chemicals are preferably carried in Department of Transportation (DOT) approved compartments. The compartments most preferably have a capacity of approximately 100 gallons but can be of any size, e.g. 50–200 gallons, or even 10–7,000 gallons.

The mobile applicator system is preferably used in conjunction with a non-ionic biodegradable surfactant. This material is compatible with bioadditives and fresh water used to treat the contaminated soil. The addition of surfactants to the remediation solution appears to aid in aeration and delivery of the remediation fluid.

The applicator system is preferably mounted on the frame of vehicle 20. When vehicle 20 is a chemical treater truck, the preferred mounted applicator system is economical because the chemical treater truck is on a well-head cleaning schedule that brings vehicle 20 to areas where soil contamination is often found. Thus, monitoring and site application during scheduled well-head maintenance is facilitated.

An alternative embodiment is a stationary applicator system with two remediation fluid tanks 24, 26, a water tank (not shown), hoses 28, 30, 34, nozzle 36 and mechanical pump 32 at a functioning site or other appropriate site with contaminated soil.

In an alternative embodiment, the applicator system is used for other types of contaminated soils and the additives are synergistic with the soil contaminants.

Another alternative embodiment is the use of the applicator system at sites where contaminated soils have been removed, for example a land farm or hazardous waste facility.

EXAMPLE

A chemical treater truck alternately equipped with 50 to 200 gallon tanks carrying various ratios of nitrates, sulfur, and ammonium nitrate in aqueous solution was used during monitoring and site application following regularly scheduled well-head maintenance. The remediation fluid was applied in stages once a month or every other month for a period of 7 to 9 months.

Soil condition was monitored. Visually, the soil showed demonstrable improvement to near original appearance. Chemical analysis of hydrocarbons showed an approximately 95% reduction in contaminating hydrocarbons.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application(s), are hereby incorporated by reference.

What is claimed is:

1. A method for applying a remediation fluid to a contaminated site comprising the steps of:
    providing a chemical treater vehicle;
    disposing at least one tank on the vehicle;
    disposing a remediation fluid within the at least one tank to enhance microbial and enzymatic activities in soil;
    delivering the vehicle to at least one site containing soil contaminated with hydrocarbons, said site selected from the group consisting of an oil well site, a gas well site an oil processing facility site, a gas processing facility site, and combinations thereof, said delivery of the vehicle made in accordance with regularly scheduled maintenance of facility equipment at the site;
    applying the remediation fluid to the ground at the contaminated site by taking the remediation fluid from the at least one tank to the ground without removing the fluid or soil; and
    reducing a concentration of the contaminating hydrocarbons on the ground by approximately more than 85%.

2. The method of claim 1 further comprising the step of delivering the vehicle to the contaminated site in need of remediation.

3. The method of claim 1 comprising the steps of:
    connecting at least one tank hose to the at least one tank;
    connecting at least one pump to the at least one tank hose;
    connecting at least one discharge hose to the at least one pump;
    attaching a nozzle system to the at least one discharge hose; and
    powering the at least one pump with the vehicle's power.

4. The method of claim 3 wherein the step of connecting at least one pump comprises connecting a mechanical pump.

5. The method of claim 3 wherein the step of connecting at least one pump comprises connecting a high-pressure pump.

6. The method of claim 1 further comprising applying the remediation fluid at high pressure to aerate the soil and improve remediating microbial and enzymatic activities.

7. The method of claim 1 comprising the step of disposing two tanks on the vehicle.

8. The method of claim 1 comprising the step of connecting two tank hoses to the at least one tank and disposing one on each side of the vehicle.

9. The method of claim 1 comprising the step of disposing two discharge hoses on the vehicle, one on each side of the vehicle.

10. The method of claim 3 comprising the step of disposing the at least one pump under the at least one tank.

11. The method of claim 1 further comprising the step of disposing bioadditives within the at least one tank.

12. The method of claim 1 further comprising the step of adding a surfactant to the said at least one tank.

13. The method of claim 1 further comprising the step of sectioning the remediation fluid out of the at least one tank for application.

14. The method of claim 1, said remediation comprising a bioadditive selected from the group consisting of nitrogen, phosphorus, ammonium nitrate, sulfur, and a combination thereof.

* * * * *